July 1, 1969 R. S. KARBO 3,452,930
PATTERN SPRINKLER
Filed June 23, 1967 Sheet 1 of 5

INVENTOR.
RICHARD S. KARBO
BY Christie, Parker and Hale
ATTORNEYS

United States Patent Office 3,452,930
Patented July 1, 1969

3,452,930
PATTERN SPRINKLER
Richard S. Karbo, Whittier, Calif., assignor, by mesne assignments, to The Leisure Group, Inc., Los Angeles, Calif., a corporation of Delaware
Filed June 23, 1967, Ser. No. 648,278
Int. Cl. A01g 25/00; B05b 1/02, 3/02
U.S. Cl. 239—70                                              27 Claims

ABSTRACT OF THE DISCLOSURE

A pattern sprinkler having multiple nozzles to produce a selectable spray pattern at short, medium and long ranges. The nozzles are rotated by a gear train coupled to a water-operated motor, and the range of the sprinkler over the sectors swept in a single rotation is adjusted by a number of movably mounted distance-control pins arranged to actuate a set of interlocked valves controlling water flow to the nozzles. The pattern established by the pins is analogous to the spray pattern of the sprinkler. A timer permits automatic shutoff of the sprinkler after a predetermined period of operation.

Background of the invention

A common problem in watering lawns, shrubs, flowers and other garden plants is to provide thorough coverage of water over the planted area, while avoiding wasteful and annoying sprinkling of driveways, sidewalks, streets, home walls and windows, and other areas which border the planted area. This problem is difficult to solve when the planted area has a shape other than the circular pattern covered by an ordinary sprinkler. Many landscaping plans involve planted areas which are rectangular, oval, or otherwise non-circularly shaped, and the home owner wants to provide adequate water for these areas while avoiding sprinkling of peripheral areas which do not need water and are preferably kept dry.

In the past, non-circular planted areas have been watered by a number of spaced-apart permanently installed sprinkler heads. This system produces satisfactory results in many cases, but is expensive to install, and is inflexible because it is not readily re-programmed to cover a revised shape or differing water requirements of the planted area. Another approach is to use a single rotating sprinkler which includes a cam to vary the contour of the sprinkled area. The cam is normally permanently installed, or is available in only a few standard contours, so this system is not well suited to the needs of a changing landscape pattern.

Another problem with both of these prior-art systems is that it is difficult to obtain an even distribution of water over the entire area to be watered. This shortcoming arises from the inability of any given nozzle to operate efficiently and evenly at both short and long ranges. That is, a nozzle which is designed for optimum operation at short range will not provide an even, efficient pattern at long ranges, and a long-range nozzle is similarly inefficient in short-range operation. In short, there exists a need for a sprinkler which operates efficiently at short, medium and long ranges, which is quickly and easily re-programmed to provide spray patterns of variable contour, which is portable for use in several planted area, and which is inexpensive and simple to use.

The pattern sprinkler of this invention meets the foregoing requirements, and permits even and effective sprinkling of areas having a wide variety of shapes. My sprinkler is a rotating unit intended for positioning within an area to be watered. The sprinkler includes a cover which mounts a number of distance-control pins which are adjustable in position to control the sprinkler range in a corresponding number of sectors in the watered area. The pattern of the pins is related to the spray pattern of the sprinkler, permitting quick and simple programming when the sprinkler is moved to a different garden area or when the outline of the garden area is changed. A plurality of nozzles with interconnected, progressively opening valves are used to insure a correct water pattern at all ranges of operation.

Summary of the invention

Briefly stated, the pattern sprinkler of this invention comprises a frame, and a nozzle assembly rotatably mounted on the frame to revolve about an axis of rotation. The nozzle assembly includes at least one nozzle, and the nozzle assembly and frame together define a water conduit extending between the nozzle and an inlet on the frame. A variable-position valve is disposed in the conduit between the inlet and the nozzle for adjusting flow through the nozzle. An adjustable distance-control means is mounted on the frame and operatively coupled to the valve, the means including a plurality of elements movable generally toward and away from the axis of rotation for controlling valve position as the nozzle is rotated.

Preferably, the distance-control elements are pins mounted to slide radially along a cover secured to the frame, and the pins define a pattern on the cover analogous to a spray pattern formed by the nozzle. In a presently preferred form, the nozzle assembly carries a plurality of nozzles, and each nozzle has associated with it a variable-position valve for individual adjustment of flow through the nozzles. Each valve includes an actuating member pivotally mounted on the nozzle assembly and having a ramp-shaped surface bearing sequentially against the pins as the assembly rotates. The members are preferably interlocked together whereby actuation of any specific actuation member by a distance-control pin simultaneously actuates any member associated with a nozzle having a shorter range than the nozzle associated with the member contacting the pin. A water motor is disposed in the conduit between the inlet and a nozzle to drive the nozzle assembly rotatably with respect to the base. An automatic timing mechanism is also actuated by the water motor, and is automatically actuated after a predetermined number of operating cycles of the sprinkler to close a shut-off valve in the inlet conduit to disable the sprinkler.

Brief description of the drawings

The invention will be described in detail with reference to the attached drawings, in which.

Description of the preferred embodiment

Figures 1, 2:
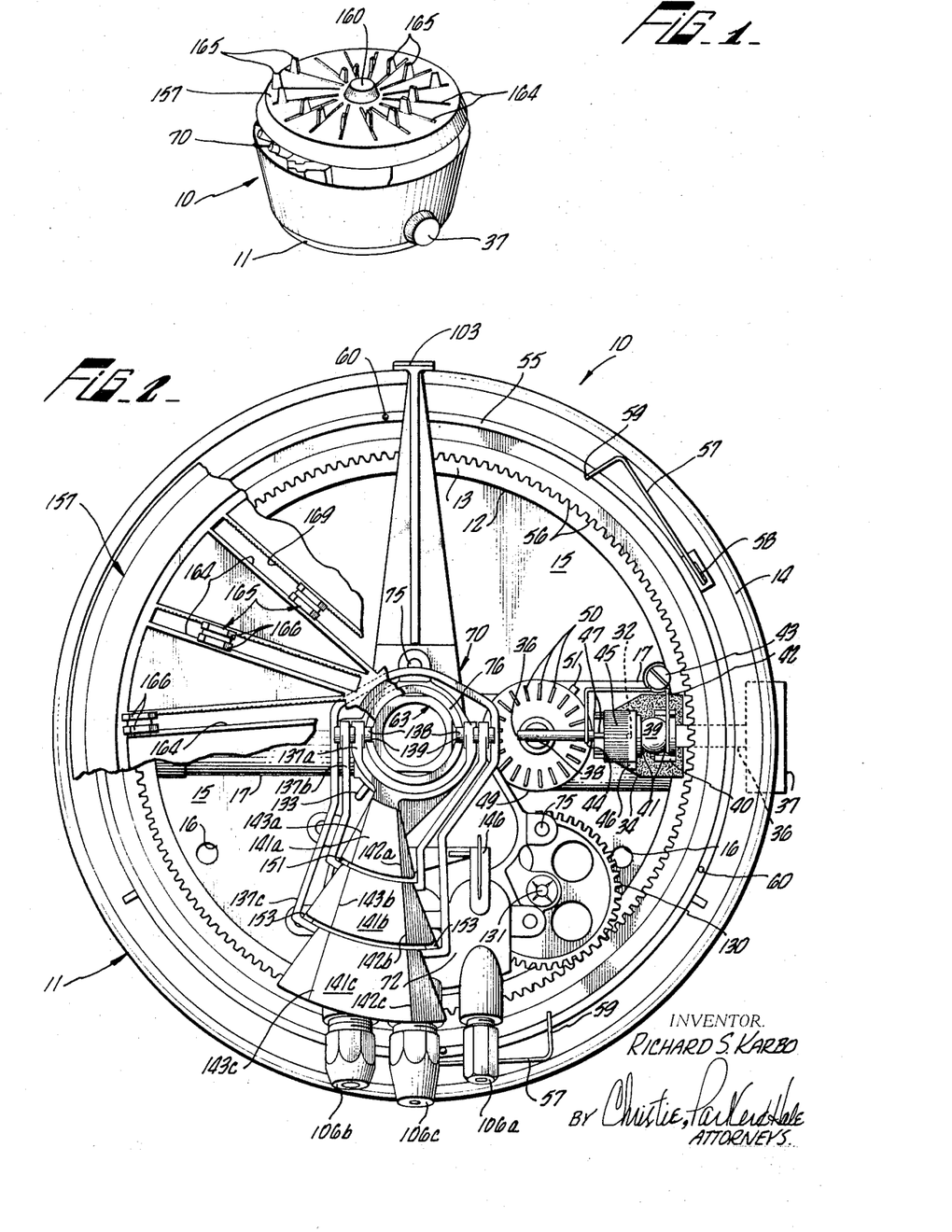
FIG. 1 is a perspective view of a pattern sprinkler according to the invention.
FIG. 2 is a top view of the pattern sprinkler with a cover mostly broken away.
Figure 3:
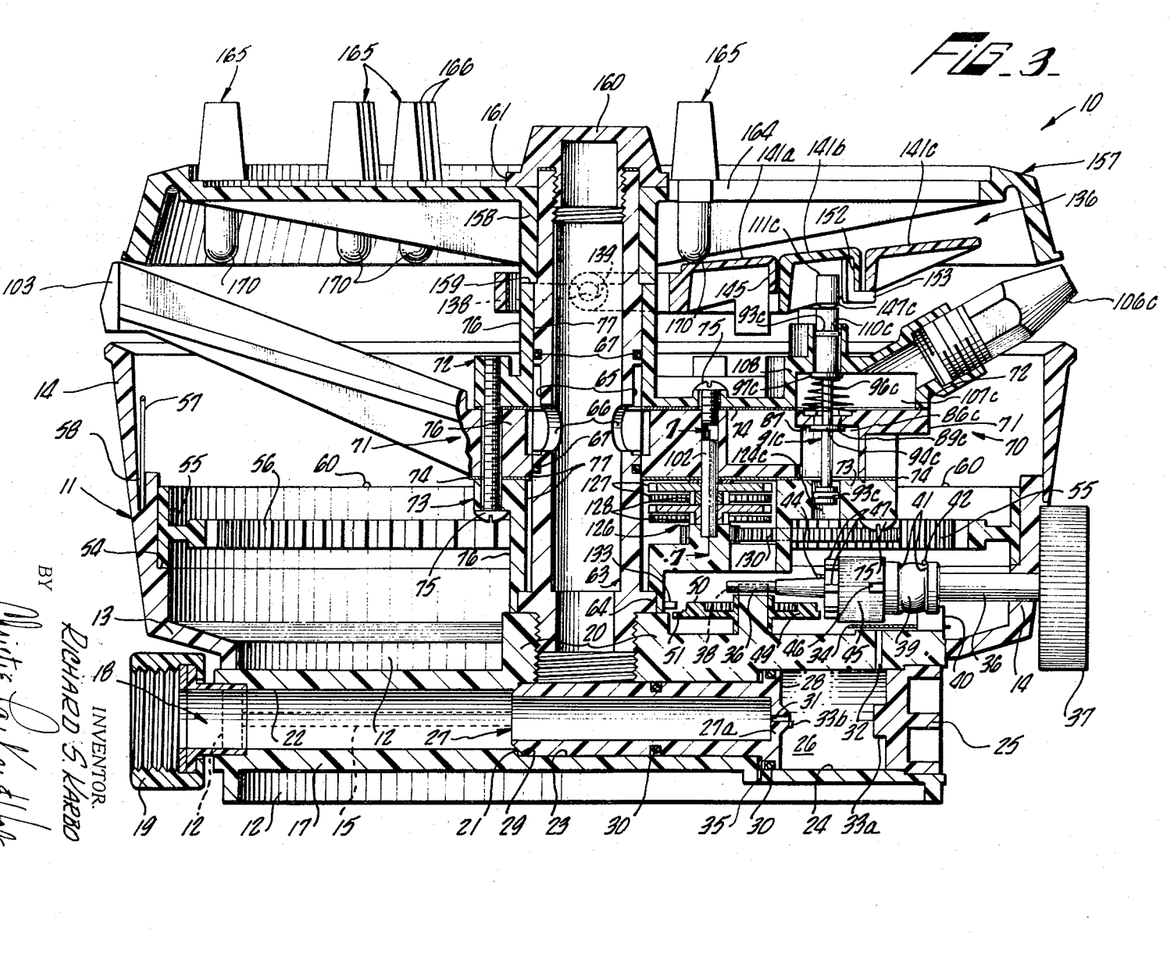
FIG. 3 is a sectional elevation of the pattern sprinkler.

A pattern sprinkler 10 according to the invention is pictured in perspective in FIG. 1, and is shown in detail in the sectional views of FIGS. 2 and 3. Referring to these drawings, the sprinkler has a stationary frame including a base 11 with an upright cylindrical wall 12 at its lower end. An outwardly extending annular flange 13 is integrally formed at the upper end of wall 12, and the outer end of the flange is integrally joined with the bottom of an upwardly extending side wall 14. As best seen in FIG. 3, side wall 14 is slightly conical in shape, and increases slightly in diameter as it extends upwardly away from flange 13.

A floor 15 having several drain holes 16 therethrough is integrally formed across the inside of cylindrical wall 12, and a tube 17 is fitted in slots (not shown) in wall 12 and secured by cement or the like to the floor, the tube being hollow to define a water inlet conduit 18. A conventional hose coupling 19 is secured at one end of the tube. A hollow, upwardly extending boss 20 is internally threaded at its upper end, and is integrally formed with the upper central part of tube 17 to form an outlet between the ends of the tube.

The inner surface of tube 17 defines a first cylindrical bore 22 extending from hose coupling 19 toward boss 20. The inner surface of the tube adjacent boss 20 defines a second cylindrical bore 23 which is coaxial with and slightly larger in diameter than bore 22, and a chamfered portion 21 of the tube extends between the tube inner walls defining bores 22 and 23. The inner surface of the right end of the tube defines a third cylindrical bore 24 which is coaxial with and slightly larger in diameter than bore 23. The extreme right end of third cylindrical bore 24 is closed by a plug 25 cemented or threaded into the tube to define a chamber 26.

A water shut-off piston 27 makes a slip fit in second cylindrical bore 23. The piston is hollow, and the right end of the piston facing plug 25 is closed by a wall 27a and has a radially extending annular portion 28 making a slip fit in third cylindrical bore 24. The left end of the piston facing coupling 19 is open and has a chamfered portion 29 which seats against chamfered portion 21 when the piston is at its full left position as shown in FIG. 3. A pair of O-ring seals 30 prevent leakage of water between the piston and the inner walls of tube 17. A small hole 31 (having a diameter of say 0.043 inch) extends through wall 27a at the right end of the piston, permitting a slight flow of water from inlet conduit 18 into chamber 26 as formed by the wall 27a, plug 25, and the walls of third cylindrical bore 24 in the tube.

A small outlet hole 32 extends through the upper wall of tube 17 at the right end of third bore 24 adjacent plug 25. A first stop 33a extends from the inner surface of the plug to limit the right-hand travel of the piston so annular portion 28 of the piston cannot cover outlet hole 32. A second stop 33b extends slightly from wall 27a and abuts stop 33a to insure a small clearance space for water to flow from hole 31 to hole 32 when the piston is in its extreme right-hand position against stop 33a. A thin, flexible flap seal 34 formed from a sheet of resilient material is secured at its right end (as seen in FIG. 3) to the top of tube 17, and extends loosely over the upper end of outlet hole 32. An air-bleed hole 35 extends through the wall of tube 17 at the left end of bore 24 to vent air trapped between seals 30.

A timer shaft 36, having a control knob 37 secured at its outer end, is journaled through the lower part of side wall 14, and the inner end of the shaft is rotatably supported in a slotted peg 38 extending upwardly from tube 17. The central part of shaft 36 has an enlarged annular portion 39 which rests slidably in a cradle 40, and a pair of annular grooves 41 are formed in the shaft on opposite sides of annular portion 39. A wire spring is secured to the upper surface of tube 17 by a screw 43, and has an arm 42 urged downwardly against the top of the timer shaft in either of grooves 41. The timer shaft and control knob can thus be moved toward or away from boss 20 (to the left and right as seen in FIG. 3) between two detent positions established by the disposition of spring arm 42 in either of grooves 41. The wire spring has a second arm 44 which is urged against the top of the inner end of the shaft to insure that it is retained in slotted peg 38.

A central portion 45 of timer shaft 36 is enlarged in diameter, and defines a cam lobe 46 which is rotatable into contact with flap seal 34 when the timer shaft is pushed in to its left-most position as shown in FIG. 3. That is, with the timer shaft in this position, cam lobe 46 is a closure means which is rotatable against flap seal 34 to seal outlet hole 32 when the shaft is rotated to position the cam lobe downwardly or at the bottom of the timer shaft. The inner or left end of timer shaft 36 can ride upwardly in slotted peg 38 as the cam lobe contacts flap seal 34, but the cam lobe is pressed against the flap seal by spring arms 42 and 44 to insure complete closure of outlet hole 32.

A set of radially extending gear teeth 47 are formed around the periphery of the inner or left end of central portion 45 of the timer shaft. A sprocket wheel 49 is rotatably mounted on slotted peg 38, and has a set of upwardly extending teeth 50 positioned around the periphery of its upper surface. A finger 51 extends from the periphery of sprocket wheel 49 and engages gear teeth 47 once during each revolution of the sprocket wheel.

The inner surface of side wall 14 defines an annular ledge 54, and a ring gear 55 having inwardly facing teeth 56 is supported on the ledge to be rotatable thereon. A plurality of wire springs 57 are spaced around the periphery of the ring gear and are secured at one end in cavities 58 in the side wall. The free end 59 of each spring bears against the top of the ring gear and urges it against ledge 54. A plurality of small, upwardly extending buttons or detents 60 are integrally formed around the upper surface of the ring gear. The springs tend to hold the ring gear stationary against a rotating force and the detents aid in resisting a rotating force as they abut free ends 59 of the springs if the gear is rotated against the restraining force of the springs.

A hollow cylindrical post 63 has a threaded lower end which is screwed into the upper end of boss 20, and the post has a radially extending annular flange 64 which abuts the top of the boss. An annular recess 65 is formed in the outer surface of the central portion of the post, and a pair of openings 66 extend through the walls of the post in the annular recess. A pair of O-ring seals 67 are positioned in grooves in the post above and below the annular recess.

Rotatably mounted on post 63 is a rotary nozzle and valve assembly 70 (best seen in FIGS. 3 and 4) which includes a center portion 71, an upper portion 72, and a lower portion 73. A pair of gaskets 74 are positioned between the mating surfaces of these portions to prevent leakage, and the center, upper and lower portions are secured together by a number of screws 75 to form a water-tight unitary assembly. The central part of assembled portions 71, 72 and 73 define a hub 76 having a bore 77 therethrough dimensioned to be a snug slip fit over post 63. The bore through lower portion 73 is made slightly larger than the outside diameter of the post to reduce frictional drag on the rotary assembly, and the bottom end of the hub of lower portion 73 abuts the upper surface of annular flange 64 on the post. O-ring seals 67 bear against the inner surface of the hub to prevent leakage of water between the post and the hub.

The interior of center portion 71 is hollow, and has a central divider wall 78 separating a turbine chamber 79 and a passage 80. The turbine chamber has a narrow inlet 81 in communication with bore 77, and the passage 80 has a wide inlet 82 in communication with bore 77. Water flowing up through the inside of the post flows into the turbine chamber and passage through annular recess 65, openings 66, and inlets 81 and 82.

Figure 5:
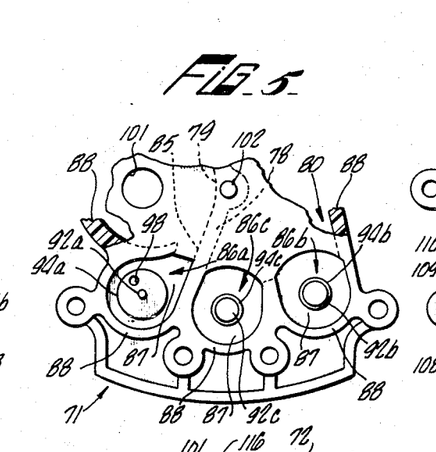
FIG. 5 is a view on line 5—5 of FIG. 4.

Turbine chamber 79 has an outlet 85 opening into a short-range valve chamber 86a (see FIG. 5) defined by a top wall 87 and a side wall 88 of center portion 71. An opening 89a is formed through top wall 87 into valve chamber 86a, and a short-range poppet valve 91a is positioned in the opening. Valve 91a has a stem 92a carrying an O-ring seal 93a, and closure disk 94a extending radially from the stem. The closure disk seats on the undersurface of top wall 87 and is urged against this seat by a conical spring 96a positioned between the upper surface of top wall 87 and a radially extending C-ring 97a engaged with the valve stem. Closure disk 94a has an opening 98 therethrough to permit a moderate flow of water through the valve even when the closure disk is positioned tightly against its seat.

Passage 80 in center portion 71 opens into a medium-range valve chamber 86b and a long-range valve chamber 86c formed by top wall 87 and side wall 88, and separated from short-range valve chamber 86a by divider wall 78. A medium-range poppet valve 91b and a long-range poppet valve 91c are mounted in the respective chambers 86b and 86c, and these valves have closure disks 94b and 94c formed on valve stems 92b and 92c. Valve 91b extends through an opening 89b in the medium-range valve chamber and is urged upwardly by a conical spring 96b secured by a C-ring 97b on the valve stem whereby closure disk 94b seats on the undersurface of top wall 87. Similarly, valve 91c extends through an opening 89c in the long-range valve chamber and is urged upwardly by a conical spring 96c secured by a C-ring 97c on the valve stem whereby closure disk 94c seats on the undersurface of top wall 87. The closure disks of the medium-range and long-range poppet valves are solid, and water flow through openings 89b and 89c is prevented when the valves are in the closed position. O-ring seals 93b and 93c on these valves prevent water leakage around the valve stems.

A circular opening 101 (see FIGS. 5 and 7) extends through the floor or turbine chamber 79. A shaft 102 is rigidly secured in the central part of center portion 71 between chamber 79 and passage 80, and the shaft extends downwardly therefrom. A handle 103 is integrally formed with center portion 71, and extends upwardly and radially outwardly to be accessible just above side wall 14. Handle 103 permits the user to position rotary nozzle assembly 70 manually during setup of the sprinkler.

Figure 4:
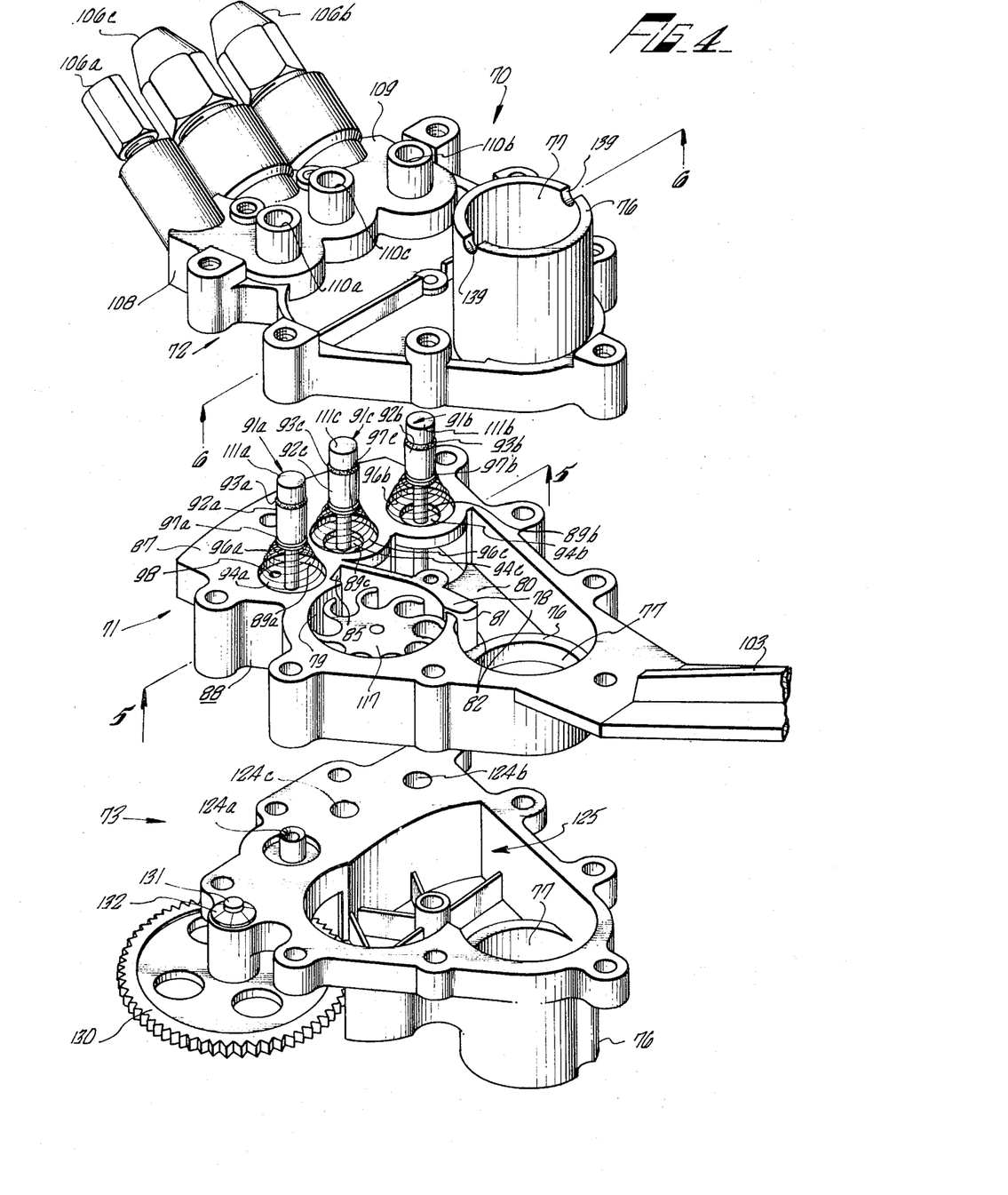
FIG. 4 is an exploded perspective view of a rotating nozzle assembly used in the sprinkler.
Figure 6:
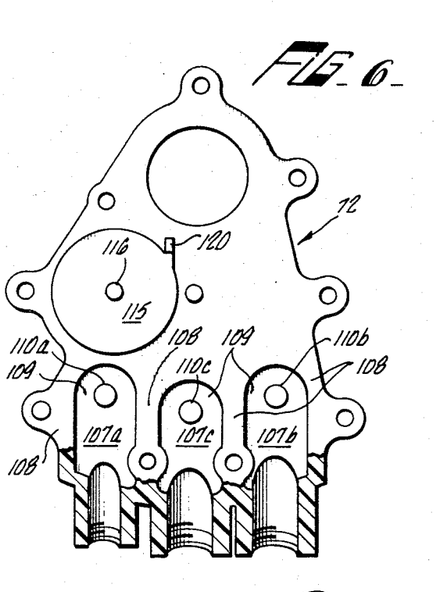
FIG. 6 is a view on line 6—6 of FIG. 4.

As best seen in FIGS. 3, 4 and 6, upper portion 72 of rotary assembly 70 carries a short-range nozzle 106a, a medium-range nozzle 106b, and a long-range nozzle 106c which are respectively in communication with a short-range nozzle duct 107a, a medium-range nozzle duct 107b and a long-range nozzle duct 107c formed by a side wall 108 and a top wall 109 of the upper portion. Three circular bores 110abc are formed through top wall 109 to extend into the respective nozzle ducts. Stems 92abc of the respective poppet valves extend through the nozzle ducts, and the upper end of each stem forms a respective plunger 111abc which extends through respective bores 110abc above the upper surface of top wall 109. When the plunger is depressed to open the poppet valve, a continuous conduit is established between the respective valve chamber, nozzle duct, and nozzle, permitting water to flow from the interior of post 63 through the hollow rotary assembly and out the nozzle or nozzles controlled by the respective valves.

A circular boss 115 is integrally formed with and extends downwardly from the undersurface of upper portion 72 to project slightly into the upper end of turbine chamber 79. A shaft 116 is rigidly secured to boss 115 and extends downwardly therefrom through opening 101 in the floor of turbine chamber 79. A water-motor turbine 117 is rotatably mounted on shaft 116 and seats in the turbine chamber. A thin plastic washer 118 is positioned between the bottom of the turbine and the floor of the turbine chamber to form a seal and to insure that the turbine rotates freely.

A pinion 119 is formed integrally with turbine 117, and extends downwardly therefrom through opening 101. A short blade 120 is integrally formed with boss 115 and extends downwardly therefrom part way into narrow inlet 81 in the turbine chamber. Blade 120 chokes the inlet to the turbine chamber to avoid the creation of a back pressure in the chamber which would interfere with efficient operation of the turbine.

Lower portion 73 of the rotary assembly includes three cylindrical bores 124abc, and the lower ends of poppet valves 91abc make a snug slip fit in these bores. The valves are thus securely retained at their upper and lower ends against lateral motion or skewing, and can only move axially as they are actuated. The lower ends of valves 91bc are enlarged to have a diameter about equal to the diameter of the portion of stems 92bc which pass through bores 110bc to provide a balanced valve which requires a relatively low opening force. The balanced feature is not needed in valve 91a because this valve is effectively always partly open due to opening 98 in its closure disk. If desired, spring 96a may be omitted from valve 91a because it is unbalanced and always partly open, and the water pressure exerted on the undersurface of its closure disk 94a urges the valve toward a seated position.

Figure 7:
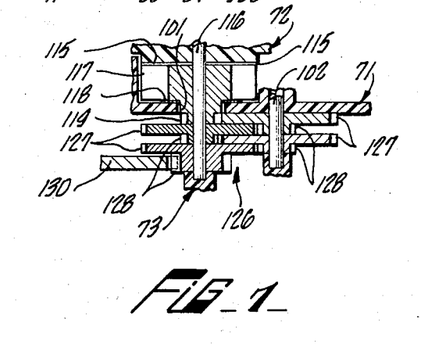
FIG. 7 is a cross-sectional elevation, taken on line 7—7 of FIG. 3, of a water-motor turbine and associated gear train.

The lower portion defines a gear chamber 125 into which extend shafts 102 and 116, and pinion 119 which is rigidly secured to water-motor turbine 117. A reduction gear train 126 is mounted on shafts 102 and 116, and includes four spur gears 127. Each of the spur gears has rigidly secured to it a small pinion gear 128. As best seen in FIG. 7, pinion 119 on the water-motor turbine engages and drives this speed-reducing gear train. A cogwheel 130 is secured to a shaft 131 which is rotatably mounted through lower portion 73 and secured against axial movement by a fastener 132 on the end of shaft 131. The cogwheel meshes with lowermost pinion gear 128 in gear train 126, and also meshes (see FIG. 2) with teeth 56 in ring gear 55. A timer drive lug 133 (see FIGS. 2 and 3) is integrally formed with and extends radially outward from hub 76 on lower portion 73 to mesh with teeth 50 on sprocket wheel 49 once during each revolution of the nozzle assembly.

Figure 8:
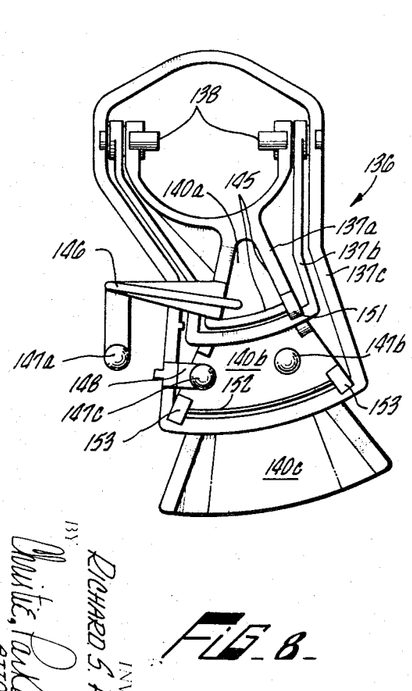
FIG. 8 is a bottom view of a valve actuator assembly used in the sprinkler.

A valve actuator assembly 136 (best seen in FIGS. 2, 3 and 8) is positioned above upper portion 72 of rotary assembly 70, and includes an inner yoke 137a, a middle yoke 137b and an outer yoke 137c, the yokes forming actuating members operatively associated with the respective poppet valves. A pair of pivot pins 138 are rigidly secured to opposite inner ends of middle yoke 137b, and make slip fits through bores in the inner ends of the inner and outer yokes whereby the three yokes are pivotally secured together. The facing ends of pins 138 rest in a pair of semi-circular slots 139 cut in opposite sides of the upper end of hub 76 on upper portion 72.

An outwardly extending pad 140a is integrally formed in the central, outer part of inner yoke 137a. The pad has an inclined upper surface defining an inner ramp 141a which slopes upwardly as it extends away from the pivotal axis of the yokes as defined by pivot pins 138. The ramp has a leading edge 142a and a trailing edge 143a (see FIG. 2), and the pad is downwardly chamfered from these edges. Similar pads 140b and 140c, and middle and outer ramps 141b and 141c, are integrally formed in the central outer parts of middle yoke 137b and outer yoke 137c.

As best seen in FIG. 3, ramps 141abc slope upwardly as they extend away from the pivot-pin axis. This upward slope is with reference to a horizontal plane passing through and perpendicular to the vertical axis of post 63. The inner end of ramp 141b is immediately adjacent the outer end of ramp 141a, and the inner end of ramp 141c is immediately adjacent the outer end of ramp 141b. As best seen in the top view in FIG. 2, ramps 141abc (as bounded by leading edges 142abc and trailing edges 143abc) are thus generally in the form of a pie-shaped circular sector, the projected center of the sector being on the pivot-pin axis slightly displaced from the axial center of post 63.

A wall 145 extends downwardly from the side edges and the radially outer edge of pad 140a. An arm 146 extends first laterally outwardly from wall 145 and then radially outwardly to terminate in a downwardly extending post 147a which bears against plunger 111a on short-range poppet valve 91a. A post 147b extends downwardly from the undersurface of pad 140b to bear on plunger 111b of medium-range poppet valve 91b. An arm 148 extends laterally inwardly from the side of outer yoke 137c and terminates in a post 147c bearing on plunger 111c of long-range poppet valve 91c.

An L-shaped coupling member 151 extends downwardly and then radially outwardly from the undersurface of wall 145 on the inner yoke. The undersurface of middle yoke 137b extends over the radially extending portion of coupling member 151. A downwardly extending wall 152 is integrally formed at the radially outer end of pad 140b on the middle yoke, and a pair of L-shaped coupling members 153 are formed at opposite ends of the wall and extend radially outward. The undersurface of outer yoke 137c rests on the radially extending portions of coupling members 153.

A circular cover 157 (see FIGS. 2 and 3) has a hollow central boss 158 which fits snugly over the top of post 63. Preferably, the upper end of the post is formed to be non-circular, and the opening in the boss is formed to mate with this non-circular portion of the post whereby the post and cover are keyed together to prevent rotation therebetween. The bottom of boss 158 rests on a ledge 159 on the post and spaced downwardly from the upper end thereof. The bottom of the boss extends across the tops of slots 139 to make pins 138 captive in the slots. A knob 160 is threaded into the hollow upper end of post 63, and has a skirt 161 bearing against the upper end of boss 158 to secure the cover on the post.

A plurality of generally radially extending and angularly spaced slots 164 are cut through the cover. As best seen in FIG. 2, the slots do not lie on true radii from the center of the cover, but are instead slightly skewed to simplify initial aiming of the sprinkler. A range-setting element such as a distance-control pin 165 is movably mounted in each of the slots. Each distance-control pin is split to form a pair of arms 166 (see FIGS. 2 and 9) which extend upwardly through slot 164.

Figure 9:
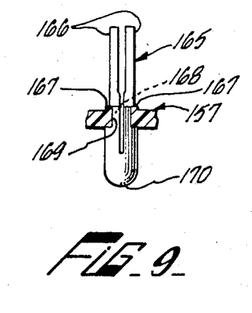
FIG. 9 is a sectional elevation of a portion of a cover used on the sprinkler, showing a distance-control pin extending through a slot in the cover.

An outwardly extending ledge 167 formed on each of arms 166 rests against the top surface of cover 157 and limits the downward travel of the pin through the slot. The surface of arms 166 on each pin defines serrations 168 which mate with corresponding serrations 169 formed in the cover along the sides of each slot 164. The serrations serve to lock the pin in any desired position along the slot, but the pin position is readily adjusted by squeezing together arms 166 to disengage serrations 168 on the pin from the serrations on the slot wall. Each pin has a lower end 170 which is rounded to ride smoothly over ramps 141abc on valve actuator assembly 136.

In operation, a water source such as a conventional garden hose (not shown) is coupled to hose coupling 19. Water flows into inlet conduit 18 against the inner or left face of wall 27a of water shut-off piston 27, and the water pressure forces the piston to the right (as seen in FIG. 3) against stop 33a whereby the water flows freely up through the hollow center of post 63. A slight flow of water passes through opening 31 in piston 27 to fill chamber 26 defined by the inner face of plug 25, the outer or right-hand face of wall 27a, and the walls of third cylindrical bore 24 of tube 17.

If chamber 26 was sealed, piston 27 would move to the left to seal off the interior of post 63 from the inlet conduit. This action would occur because the water would be at equal pressure on both sides of the piston, and the right end (as seen in FIG. 3) of the piston has a larger effective surface than the left end of the piston, resulting in a net force urging the piston to the left. However, water passing through opening 31 and into chamber 26 is allowed to leak out through outlet hole 32 as long as cam lobe 46 on timer shaft 36 does not bear against flap seal 34. The slight flow of water passing through outlet hole 32 drains through drain holes 16 in base 11, and this leakage flow prevents the water pressure in the chamber at the right end of the piston from achieving a level sufficient to create an over-balancing force on the piston to move it to the left.

With the shut-off piston against stop 33a, water flows upwardly through post 63 and out of openings 66 to circulate through annular recess 65 in the post into inlet 81 and the turbine chamber and inlet 82 into passage 80. Assuming that medium-range and long-rang poppet valves 91b and 91c are closed, no further flow occurs through passage 80 once passage 80 is filled with water. Short-range poppet valve 91a, however, is never completely closed due to opening 98 in its closure disk, and there is thus a moderate flow of water through the turbine chamber even if closure disk 94a on the short-range poppet valve is seated against the undersurface of top wall 87. That is, there is a constant moderate flow (whenever shut-off piston 27 is in the open position) through inlet 81 into the turbine chamber, and out through outlet 85, opening 98 in the short-range poppet valve, and into short-range nozzle duct 107a to discharge through short-range nozzle 106a.

Water-motor turbine 117 in the turbine chamber is rotated by this constant moderate flow, and drives reduction gear train 126 through pinion 119 on the turbine. Output pinion gear 128 of the gear train drives cogwheel 130 which is in turn meshed with ring gear 55 on the base. Rotation of the cogwheel thus drives rotary nozzle assembly 70 rotatably around the post. The turbine and reduction gear train are preferably selected to provide a nozzle-assembly rotational speed of about one revolution per minute.

The rotation of the rotary nozzle assembly can be stopped at any desired point during setup of the sprinkler by holding handle 103 in a stationary position. When this is done, ring gear 55 slides on annular ledge 54 to rotate with respect to base 11. This mounting of the ring gear thus provides a clutch which prevents stripping of gear teeth in the water-motor drive system by the high torque forces delivered at the low-r.p.m. output pinion of reduction gear train 126. The clutch is also a safety feature which prevents gear stripping in the event of inadvertent jamming of the rotary nozzle assembly as might occur, for example, if a twig became lodged between the rotary nozzle assembly and the cover or base of the sprinkler.

In normal operation, the ring gear is held stationary with respect to the base by springs 57. Any rotation of the ring gear which might occur in spite of the force delivered by the springs will terminate when the springs abut detents 60 on the ring gear. However, the torque delivered by the reduction gear train is sufficient to force the detents under ends 59 on the springs and allow slippage of the ring gear if the rotary nozzle assembly is either intentionally or inadvertently held in a stationary position.

If continuous operation of the sprinkler is desired, control knob 37 is pulled outwardly to position spring arm 42 in the left (as veiwed in FIG. 3) or radially innermost groove 41 in annular portion 39 on the timer shaft. When the shaft is in this position, cam lobe 46 is disposed radially outwardly of outlet hole 32, and the cam lobe will not force flap seal 34 against hole 32 regardless of the rotational position of the cam lobe. A slight flow of water is thus continually permitted through outlet hole 32 past flap seal 34, and shut-off piston 27 remains in its open position against stop 33a to permit continuous flow of water through the sprinkler.

If automatic shut off of the sprinkler is desired after a predetermined sprinkling period, control knob 37 is pushed inwardly to the position shown in FIG. 3 in which spring arm 42 rests in radially outermost groove 41. With the shaft in this position, and assuming that cam lobe 46 is angularly displaced from flap seal 34, the shut-off piston will be in the open position and the rotary nozzle assembly will be driven normally by the water motor. Each time the nozzle assembly makes one revolution, timer drive lug 133 engages one of teeth 50 on sprocket wheel 49 to advance the sprocket wheel through a fraction of a turn. Continued rotation of the nozzle assembly will eventually rotate the sprocket wheel through a full revolution during which finger 51 on the sprocket wheel engages one of gear teeth 47 on central portion 45 of the timer shaft to rotate the timer shaft through a fraction of a revolution. Nozzle-assembly rotation thus eventually rotates the timer shaft into a position where cam lobe 46 bears directly on flap seal 34 to close outlet hole 32.

When outlet hole 32 is closed by the cam lobe bearing against the flap seal over the outlet hole, the water pressure on the opposed faces of shut-off piston 27 equalizes. As explained above, the total surface area on the inner or right-hand face (as viewed in FIG. 3) of the piston exceeds the surface area of the left face of the piston, and equalization of the water pressure on the two sides of the piston therefore results in a force moving the piston to the left to close off the outlet opening through boss 20 and the hollow interior of post 63 from the water conduit. Flow through the post, valves and nozzles is thus terminated, and the water motor ceases to operate.

Operation of the sprinkler is again started by rotating control knob 37 until cam lobe 46 no longer bears against the flap seal, or simply by snapping the control knob outwardly such that the cam lobe is positioned radially beyond outlet hole 32. With the cam lobe thus positioned, water flow through the outlet hole reduces the pressure on the right-hand face of the piston and permits it to slide against stop 33a. The timer is used to select a predetermined sprinkling period by rotating it to an initial position which requires the desired number of rotational cycles of the nozzle assembly to position the cam lobe back against the flap seal.

As the nozzle assembly is rotatably driven by the water motor, valve actuator assembly 136 rotates around post 63 under cover 157. Ramps 141abc on yokes 137abc of the valve actuator assembly slope upwardly toward the cover as they extend radially away from post 63, and the yokes are urged upwardly by springs 96abc on the poppet valves. For any given angular position of the valve actuator assembly, one of distance-control pins 165 has its lower end 170 bearing against one of the ramps 141abc.

As the distance-control pin is moved radially outwardly in its slot 164, the valve actuator assembly pivots around pins 138 to move downwardly toward the base of the sprinkler. That is, the distance-control pin is constrained against vertical movement with respect to the cover, and the upward slope of the ramps forces the associated yokes of the actuator assembly to pivot downwardly as the pin is moved toward the periphery of the cover. As the pin is moved outwardly, posts 147abc on the yokes are successively forced against plungers 111abc on the poppet valves to progressively open the valves and permit flow through first the short-range nozzle, then the short-space and medium-range nozzles, and finally through all three nozzles as the pin is moved outwardly against ramp 141c on the outer yoke. As best seen in FIG. 2, the slight skewing of slots 164 aligns them with the ramps to simplify aiming of the sprinkler during initial setup of the distance-control pins.

Figure 10:
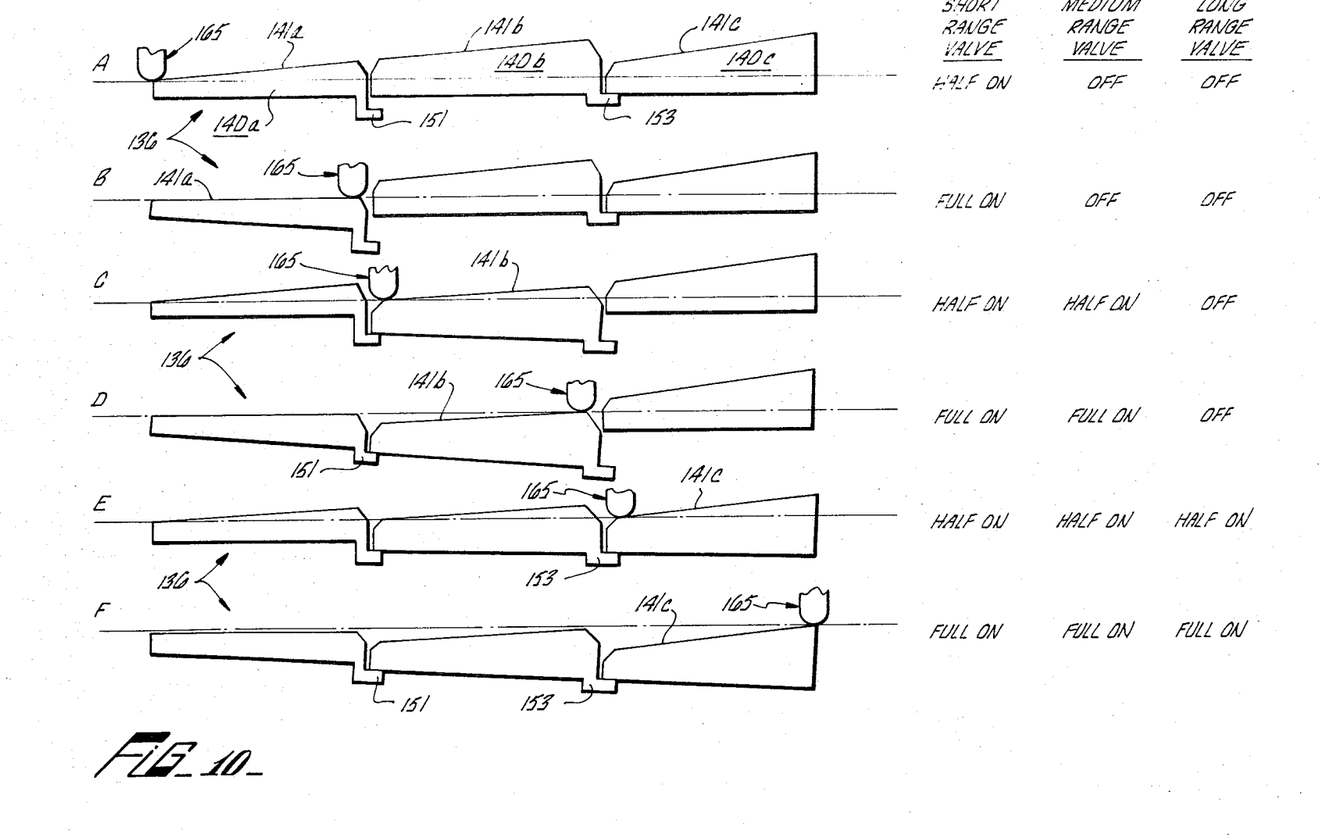
FIG. 10 is a schematic representation of the interlocking relation of the several members of the valve actuator assembly for various positions of a distance-control pin.

The interlocking relationship of the yokes in the valve actuator assembly is most easily understood with reference to the schematic diagrams in FIG. 10. Referring to this drawing, the uppermost diagram A shows a distance-control-pin 165 retracted into its radially innermost position in its slot 164. With the pin in this position, the pin, valve actuator assembly, and poppet valves are arranged with respect to each other such that posts 147abc rest lightly on plungers 111abc of the poppet valves and do not exert sufficient force on the plungers to unseat any of the valves. However, as indicated in the flow chart at the right side of FIG. 10, short-range valve 91a is approximately half open even though its closure disk is seated against the undersurface of upper portion 72 because a substantial flow occurs through opening 98 in closure disk 94a. As discussed above, this moderate flow is provided regardless of the positioning of the distance-control pins to insure that water flows through the turbine chamber to operate the water motor at all times when the sprinkler is coupled to a water source and shut-off piston 27 is against stop 33a.

In diagram B in FIG. 10, distance-control pin 165 has been moved outwardly in its slot to bear against the radially outer part of ramp 141a on the inner yoke. In this position, the inner yoke is forced to pivot downwardly toward the base, and post 147a forces plunger 111a downwardly to open the short-range poppet valve fully to permit maximum flow through the short-range nozzle. Pin positions intermediate the positions shown in diagrams A and B will of course cause nozzle flow rates between the half-on rate and the full-on rate due to the upwardly inclined sloping surface of the ramp.

Diagram C of FIG. 10 shows the distance-control pin positioned to bear against the radially inner edge or ramp 141b on the middle yoke. In this position, the middle yoke is sufficiently depressed to open the medium-range poppet valve about half on. The inner yoke, however, has returned to the position shown in diagram A as it is urged upwardly by conical spring 96a on the short-range valve. With this configuration, the short-range nozzle produces a spray pattern covering an area from the sprinkler to a point midway along its maximum range. The spray pattern of the medium-range nozzle begins where the pattern of the short-range nozzle ends, and extends to a range slightly beyond the maximum range of the short-range nozzle. As the distance-control pin is moved radially outwardly, the short-space and medium-range valves are gradually opened until both valves are fully open and the pin is in the position shown in diagram D of FIG. 10. Althouh the pin bears against only the ramp of the middle yoke, inner yoke 137a is carried downwardly by middle yoke 137b which engages L-shaped coupling member 151 on the inner yoke. The two yokes are thus interlocked to pivot downwardly together as the pin is moved outwardly, resulting in parallel, progressive opening of the short- and medium-range valves.

When the distance-control pin is moved into the position shown in diagram E to bear against the radially inner edge of ramp 141c on the outer yoke, the three yokes are positioned to permit approximately half-maximum flow through the three nozzles. The short-range valve is seated when the pin is in this position, but, as explained above, flow still occurs through opening 98 in the valve closure disk. The medium- and long-range valves are moved to a half-on position by posts 147b and c which are urged against plungers 111b and c to overcome the valve-closure force exerted by springs 96bc. Although the distance-control pin rests only against the ramp on the outer yoke, the middle yoke is forced to pivot downwardly because it is coupled to the outer yoke by L-shaped coupling members 153.

As the pin is moved toward the radially outer part of ramp 141c on the outer yoke, the three poppet valves are progressively opened until they reach a full-on position when the pin is in its radially outermost position as shown in diagram F. The three valves are opened progressively and in parallel because the three yokes are interlocked together by the coupling members. A continuous spray pattern of constantly increasing range is thus provided by the nozzles as the distance-control pin is moved radially outwardy in its slot.

As nozzle assembly 70 is rotated by the water motor, the valve actuator assembly rotates therewith to come into serial contact with each of the distance-control pins. The pins are spaced such that leading edges 142abc move under a slot 164 to contact a distance-control pin just as the pin in the neighboring slot moves off of trailing edge 143abc on one of the ramps. The chamfered edges on the ramp provide a smooth transition as the yokes rotate away from one pin into contact with the neighboring pin. Each pin controls the range of the sprinkler in a specific sector of the sprinkler pattern, and the range of course varies depending upon the setting of the pins. The pin positions on the cover thus present a "map" or pictorial representation of the area which will be covered by the sprinkler as it rotates. This feature of the invention is especially advantageous as it permits quick and very simple setup of the sprinkler in garden areas having an unusual contour. The use of about sixteen angularly-spaced distance-control pins mounted in associated slots in the cover has been found to provide an adequate number of separately controllable sectors in the sprinkler pattern to meet all normal requirements.

There has been described a novel pattern sprinkler incorporating a plurality of nozzles which are controllable to produce an efficient spray pattern over garden areas of widely varying contours. The sprinkler is portable, and is easily adjusted for different spray patterns when used in several different areas. The various major components of the sprinkler are readily molded from conventional plastic materials to provide a unit which can be manufactured at a relatively low production cost. The timer unit permits automatic unattended shutoff of the sprinkler after a predetermined period of operation, and the ring-gear clutch insures against damage to the sprinkler parts should the rotating nozzle assembly be purposely or inadvertently held stationary while the water motor is in operation.

While the invention has been described in a specific, presently preferred form, it is to be understood that there are various modifications and alterations of the preferred form which are possible within the broad concept of the invention.

I claim:
1. A pattern sprinkler comprising:
   a frame;
   a nozzle assembly having a nozzle and being rotatably mounted on the frame to revolve about an axis of rotation, the assembly and frame defining a water conduit extending between the nozzle and an inlet on the frame;
   a variable-position valve in the conduit between the inlet and the nozzle for adjusting flow through the nozzle;
   adjustable distance-control means mounted on the frame, operatively coupled to the valve, and including a plurality of elements movable generally toward and away from the axis of rotation for controlling valve position as the nozzle is rotated, the elements defining a pattern on the cover analogous to a spray pattern formed by the nozzle.

2. The pattern sprinkler defined in claim 1 in which the valve is mounted on the nozzle assembly to rotate therewith.

3. The pattern sprinkler defined in claim 2 in which the frame includes a cover having a plurality of angularly spaced slots extending generally radially from the axis of rotation, and in which the distance-control elements are pins movably mounted in the slots and arranged to open the valve progressively when moved radially outwardly in the slots.

4. The pattern sprinkler defined in claim 3 in which the valve includes an actuating member movably mounted on the nozzle assembly and having a ramp-shaped surface bearing sequentially against the pins as the assembly rotates, the member being moved by the pins to adjust the valve whereby flow through the nozzle is controlled by pin position.

5. A pattern sprinkler, comprising:
   a base having an inlet conduit;
   a nozzle assembly rotatably mounted on the base and communicating with the inlet conduit, the nozzle assembly including a plurality of nozzles and a plurality of variable-position valves for individual adjustment of flow through each nozzle, the nozzles having different optimum operating ranges and being mounted generally parallel to each other to be aimed in substantially the same direction for any given position of the nozzle assembly; and
   distance-control means coupled between the base and the nozzle assembly for varying nozzle flow as the valve assembly rotates, the distance-control means including a range-setting element operable to actuate the valves progressively whereby flow of increasing operating range through the nozzles is obtained as the element is moved from a short-range position to a long-range position.

6. The pattern sprinkler defined in claim 5 in which the base includes a cover, and the distance-control means includes a plurality of range-setting elements mounted on the cover to be movable generally toward and away from an axis of rotation of the valve assembly, the elements being arranged for serial control of the valves whereby each element is individually adjustable to control sprinkler range in a specific sector swept by the valve assembly as it rotates.

7. The pattern sprinkler defined in claim 6 in which the distance-control means includes a plurality of actuating members mounted in radial alignment on the valve assembly to rotate therewith, each member being operatively associated with one of the valves and cooperating with the range-setting elements to vary the valve position in accordance with the position of the elements as the valve assembly rotates.

8. The pattern sprinkler defined in claim 7 in which the actuating members have ramp-shaped surfaces adapted to bear sequentially against the range-setting elements as the valve assembly rotates.

9. The pattern sprinkler defined in claim 8 in which the actuating members include coupling means for interlocking the members together whereby actuation of any specific actuating member by a range-setting element simultaneously actuates any member associated with a nozzle having a shorter range than the nozzle associated with the specific member.

10. The pattern sprinkler defined in claim 9 and further comprising a water motor disposed in the inlet conduit for rotating the valve assembly, and a timing means operable by the water motor and including a shut-off valve in the inlet conduit for terminating flow through the inlet conduit after a predetermined number of operative cycles of the sprinkler have occurred.

11. A pattern sprinkler comprising:
    a base having an inlet conduit;
    a nozzle assembly rotatably mounted on the base and communicating with the inlet conduit, the nozzle assembly including a plurality of nozzles and a plurality of variable-position valves for individual adjustment of flow through each nozzle;
    valve-actuating means mounted on the nozzle assembly to rotate therewith and operatively engaged with the valves for adjusting flow therethrough;
    a cover secured to the base;
    a plurality of distance-control pins mounted on the cover to be movable generally toward and away from an axis of rotation of the nozzle assembly, the pins being arranged for serial contact with the valve-actuating means as the nozzle assembly rotates.

12. The pattern sprinkler defined in claim 11 and further comprising water-motor means operable by fluid flow through the inlet conduit and coupled to the base and nozzle assembly for driving the nozzle assembly rotatively with respect to the base.

13. The pattern sprinkler defined in claim 12 in which the nozzle assembly defines a turbine chamber, and in which the water-motor means includes a turbine rotatably mounted in the chamber, the chamber having an inlet communicating with the inlet conduit and an outlet communicating with one of the valves, said one valve having an apertured closure disk to permit a moderate fluid flow therethrough even when the closure disk is seated in a closed position.

14. The pattern sprinkler defined in claim 13 in which at least the valves other than said one valve are of a balanced poppet type to be movable from a seated position by a relatively small force.

15. The pattern sprinkler defined in claim 12 in which the water-motor means includes a clutch adapted to slip when the nozzle assembly is held stationary while the water-motor means is being operated by fluid flow.

16. The pattern sprinkler defined in claim 12 in which the water-motor means includes a turbine, a speed-reduction means coupled to the turbine and having a low-speed output gear, and gear means on the housing and meshed with the output gear.

17. The pattern sprinkler defined in claim 16 in which the gear means comprises a ring gear supported on the base to be rotatable, and resilient means urging the ring gear against the base whereby the ring gear is normally stationary with respect to the base and is rotatable with respect to the base to provide a clutch in the water-motor means.

18. The pattern sprinkler defined in claim 11 and further comprising timer means coupled to the water-motor means to be driven thereby and operable to terminate fluid flow through the sprinkler after a predetermined period of operation.

19. The pattern sprinkler defined in claim 18 in which the inlet conduit includes an opening through which fluid flows to the nozzle assembly, and in which the timing means includes a shut-off piston disposed in the inlet conduit to be movable between a first position in which the piston is clear of the opening and a second position in which the piston covers the opening and prevents fluid flow to the nozzle assembly, the timing means further including valve means associated with the conduit and operable to actuate the piston hydraulically between the first and second positions.

20. The pattern sprinkler defined in claim 11 in which the valve-actuating means includes a plurality of actuating members mounted on the nozzle assembly and movable to actuate the valves to adjust flow therethrough, each valve having associated with it a respective actuating member, the pins being arranged whereby one pin is in contact with one of the members for any position of the nozzle assembly to vary the position of the member and associated valve as the pin is moved in its slot.

21. The pattern sprinkler defined in claim 20 in which the actuating members include interlocking means for coupling the members together whereby movement of a pin radially outwardly in its slot when the pin is aligned with the members causes progressive actuation of the valves.

22. The pattern sprinkler defined in claim 21 in which the actuating members have ramp-shaped upper surfaces to contact the pins, the surfaces being aligned with each other in the general form of a circular sector, the surfaces sloping upwardly as they extend away from the axis of rotation whereby radially outward movement of a pin in contact with one of the surfaces causes movement of the member to increase flow through the associated valve.

23. The pattern sprinkler defined in claim 22 in which the members have yoke-shaped radially inner ends which are pivotally supported on the nozzle assembly whereby the members are pivotable about an axis generally perpendicular to the axis of rotation.

24. The pattern sprinkler defined in claim 22 in which the cover defines a plurality of generally radially extending slots therethrough, each slot having mounted therein a respective pin, the slots being skewed slightly from a true radial with respect to the axis of rotation.

25. The pattern sprinkler defined in claim 24 in which the pins and slots have mating serrated surfaces for securing the pins in selected positions along the slots.

26. The pattern sprinkler defined in claim 24 in which the nozzles have different optimum operating ranges and are mounted generally parallel to each other to be aimed in substantially the same direction for any given position of the nozzle assembly.

27. The pattern sprinkler defined in claim 26 in which the pins and actuating members are configured to relate valve positions to radial positions of the pins whereby a pattern of pin positions is indicative of a spray pattern formed by the nozzles, and further comprising water-motor means operable by fluid flow through the inlet conduit and coupled to the base and nozzle assembly for driving the nozzle assembly rotatively with respect to the base, and timer means coupled to the water-motor means to be driven thereby and operable to terminate fluid flow through the sprinkler after a predetermined period of operation.

References Cited
UNITED STATES PATENTS 2,805,098  9/1957  Hurley.
3,095,148  6/1963  Smith _______________ 239—97

M. HENSON WOOD, Jr., *Primary Examiner.*

M. Y. MAR, *Assistant Examiner.*

U.S. Cl. X.R.

239—98, 232, 236, 240, 243, 247